Nov. 19, 1968 N. E. MOSERES 3,411,463
FROZEN CONFECTION MOLDS
Filed May 31, 1966
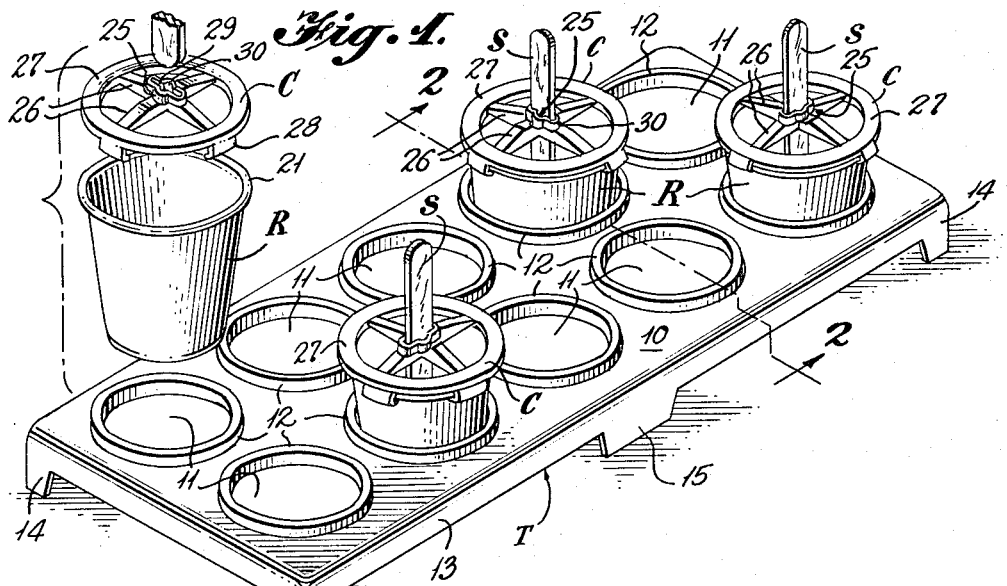
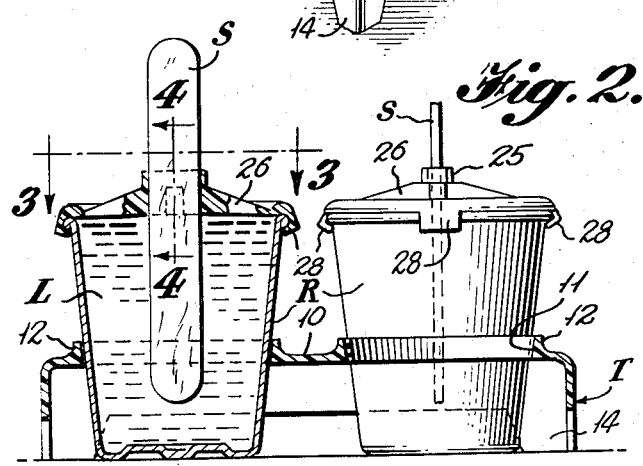
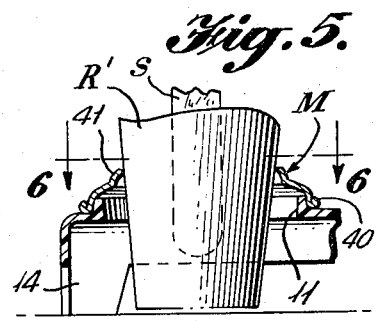
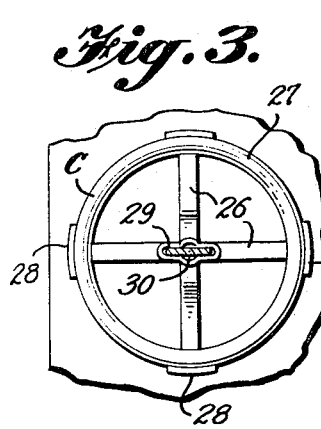
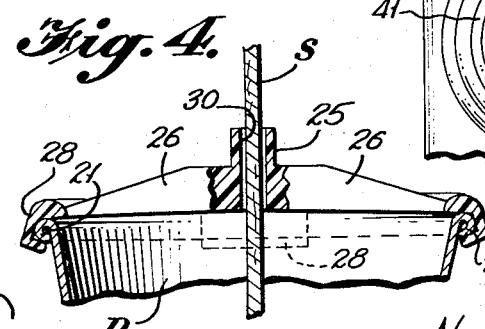
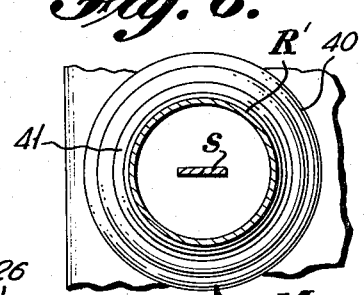
INVENTOR.
Nestor E. Moseres United States Patent Office 3,411,463
Patented Nov. 19, 1968

3,411,463
FROZEN CONFECTION MOLDS
Nestor E. Moseres, Carrera 67, 40–75 Apartado
Aereo 2666, Barranquilla, Colombia
Filed May 31, 1966, Ser. No. 553,875
3 Claims. (Cl. 107—19)

ABSTRACT OF THE DISCLOSURE

This invention relates to frozen confection molds and primarily to the provision of a stick-holding cap therefor characterized by an apertured stick-holding central hub having spaced spokes radiating therefrom joined by a lug-carrying felly whereby more uniform freezing of the confection is attained and the cap more readily removed from the mold.

---

The instant invention relates to frozen confections and more particularly to trays, cups and caps for molding and freezing individual confections on a stick for home consumption, but not necessarily limited thereto.

While frozen confection molds for the purpose specified are known, yet it has been found that certain drawbacks and disadvantages have arisen in their use. Thus, in those constructions where the stick-holding cap is solid and embraces the entire rim of a mold or cup, non-uniform freezing may take place and some difficulty experienced in removing the cap. Furthermore, it is frequently advantageous to employ molding cups of varying sizes with the same tray; also a choice in the type of stick for holding the frozen confection while being consumed may be desirable.

Accordingly, it is a primary object of the invention to improve devices of the type aforementioned to obviate the shortcomings set out in the preceding paragraph.

The above and other aims and objects will be apparent from the detailed description hereinafter appearing when taken in conjunction with the appended drawing, forming a part hereof, to which attention is now directed and in which:

FIGURE 1 is an exploded perspective view showing an apertured tray with several molding receptacles or cups in position for freezing, as well as a single cup, cap and stick disassembled.

FIGURE 2 is a sectional view taken on line 2—2 of FIGURE 1.

FIGURE 3 is a plan view, partly in section, taken on line 3—3 of FIGURE 2.

FIGURE 4 is a sectional view taken on line 4—4 of FIGURE 3.

FIGURE 5 is a fragmentary view, partly in section and partly in elevation, of a cup adapter usable with the tray of FIGURE 1, and FIGURE 6 is a plan view, partly in section, taken on line 6—6 of FIGURE 5.

Referring first to FIGURES 1 to 4 inclusive, there will be seen a tray T preferably of a light, but rigid, plastic material comprising a top 10 having a series of similar circular openings 11 each of the same diameter and each defined by an upright annular rim 12. Top 10 further includes a depending flange 13, corner legs 14 and intermediate legs 15 whereby the tray may rest on a horizontal surface. The unit so far described is structurally integral and may be molded from polyethylene, polystyrene or plasticized vinyl chloride or any other of the various polymers now in common use.

Reference character R designates a number of similar tapered metal receptacles or cups each having a narrow rolled rim or bead 21 and each adapted to be received within one of the openings 11 of the tray; while C is a plastic spider-like cap for suporting a wooden stick S in position for freezing a liquid comestible thereabout as will be more fully set out hereinafter.

Cap C comprises a central hub 25 and a plurality of spaced radial spokes 26 extending outwardly and slightly downwardly from the hub, said spokes joined to an annular rim or felly 27. A number of uniformly spaced downwardly and inwardly-directed lugs 28 depend from said rim and, as will be noted, there is one lug located at a point on the rim where it is joined to one of the spokes 26. As previously mentioned, the cap is formed of plastic, but is semi-rigid, and possesses sufficient flexibility whereby the spokes 26 may be flexed and released to bring the lugs 28 on the rim 27 into frictionally embracing relationship with rolled rim 21 of each cup R. Each hub 25 has a longitudinal slot 29 and a circular central opening 30. As in the case of the tray, cap C is also a unitary molded member.

In the use of the structure so far described, all of the cups R, or as many as may be needed, are filled with a liquid L to be frozen such as fruit juices, chocolate milk or any other chosen liquid or semi-liquid, an example of the latter being a soft custard. To allow for expansion during freezing, it is best not to fill the cups to their rims. A stick S is then inserted to an appropriate depth in slot 29 of cap C where it is frictionally held and the latter secured to a cup R by flexing the spokes 26 to engage lugs 28 on a beaded rim 21, whereby the stick projects partially into the liquid. The filled cups are now inserted in the openings 11 in tray T and the whole placed in the freezer compartment of a home refrigerator to be frozen. After freezing, individual units may be removed from the tray and it will be found that the frozen comestible can be readily separated from its cup or mold by merely subjecting the latter for a short period of time to the heat of a human hand. No difficulty is experienced in unsnapping the cap C from the rim of the cups due to the flexibility of the spokes 26 and because of the spaces between said spokes it will be apparent that more uniform freezing takes place. In lieu of the flat wooden stick shown in the drawings, a circular one may be used, in which case it would be inserted and frictionally mounted in opening 30. The frozen comestible after removal may now be held in the hand by the stick and consumed.

It is frequently desirable to utilize molding cups R of varying capacities to provide for both older and younger children. Toward this end, there is shown in FIGS. 5 and 6 an adapter member M comprising a stepped metal ring having a lower portion 40 of a diameter to embrace rim 12 of the tray T and an upper portion 41 of smaller diameter to receive a mold cup R′ of less size and volume than a cup R. Accordingly, frozen confections of different sizes may be simultaneously made by this means.

From the above description, it will be apparent that various objects and aims of the invention have been attained. Others will be evident to those skilled in the art and it is contemplated to cover all such and to be limited in this respect only as may be necessary by the scope of the claims hereto appended.

What I claim and desire to secure by Letters Patent is:

1. A mold assembly for preparing frozen confections comprising a tray having a flat top and spaced feet for supporting same, said top having a series of similar openings, molding cups, each having a beaded rim, removably mounted in said openings, a flexible stick-supporting cap for each of said rims, each cap including a central hub, spaced spokes radiating from said hub, a felly joining said spokes and means carried by each felly for removably engaging the rim of a molding cup, the spaces between said spokes exposing the confection placed in said cups to direct freezing.

2. The structure of claim 1, in which the means carried by the felly for removably engaging a cup rim comprises a plurality of spaced lugs.

3. The structure of claim 2, in which said lugs extend downwardly and inwardly from said felly and each is located at the junction of a spoke with a felly.

References Cited

UNITED STATES PATENTS

| | | | |
|---|---|---|---|
| 2,522,912 | 9/1950 | Weiss | 211—74 |
| 2,702,011 | 2/1955 | Larkin | 249—92 |
| 2,814,404 | 11/1957 | Towns | 215—41 |
| 2,819,690 | 1/1958 | Baker | 249—92 |
| 2,946,207 | 7/1960 | Hulterstrum | 249—92 |
| 2,980,039 | 4/1961 | Jolly | 107—54 XR |

FOREIGN PATENTS

| | | |
|---|---|---|
| 191,556 | 6/1937 | Switzerland. |

WALTER A. SCHEEL, *Primary Examiner.*

A. O. HENDERSON, *Assistant Examiner.*